Patented Jan. 30, 1940

2,188,581

UNITED STATES PATENT OFFICE 2,188,581

CATHODE RAY TUBE

Kurt Schlesinger, Berlin, Germany, assignor, by mesne assignments, to Loewe Radio, Inc., a corporation of New York Application April 20, 1937, Serial No. 137,897
In Germany April 22, 1936

3 Claims. (Cl. 250—164)

The invention relates to cathode ray tubes, more particularly for television projection and transmission purposes, having a built-in optical objective for improving the guidance of the light. It is known that the cathode ray energies which it is technically possible to control at the present time are hardly sufficient, even with potentials of 10–30 kv., for supplying a satisfactory and bright projection image. The principal losses associated with previous projection arrangements were of an optical nature. The light generated at the luminous screen leaves the luminous image point in equal intensity towards all sides: the image point is a "spherical radiator". Of this spherical radiation a small cone only is made use of, corresponding to the inlet aperture of the reproducing objective. If graded objectives are employed, in which the first lens with weak refractive powers is arranged near the luminous screen and the lenses following thereon possess increasing refractive powers, the enlargement is augmented to an undesirable extent, so that the surface brightness does not appreciably increase.

According to the invention a refractive glass and air surface is provided as near as possible to the luminous screen. If the location of this refractor lens coincides with the luminous screen itself, the virtual image of the luminous screen remains, in accordance with the laws of optical lenses, at the same location. It must, therefore, be theoretically possible to keep the scale of reproduction of the arrangement: luminous screen, objective and image screen constant, but to collect the rays of light towards the objective and thus increase the surface brightness of the image screen. This is in point of fact possible in arrangements as shown in the appended drawing.

Figure 1:
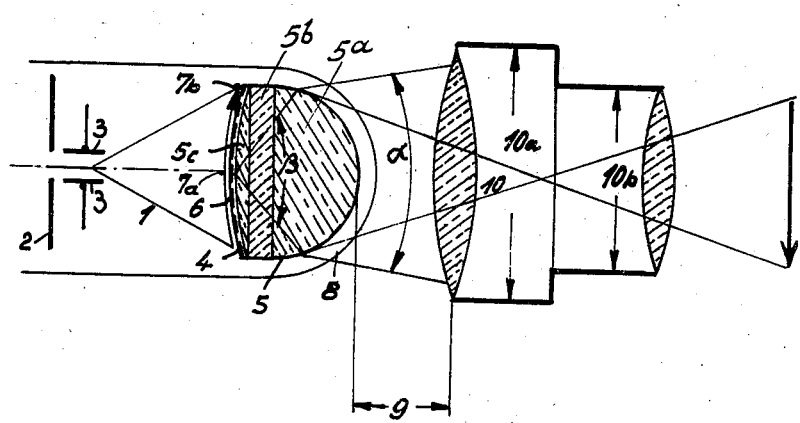
Figure 2:
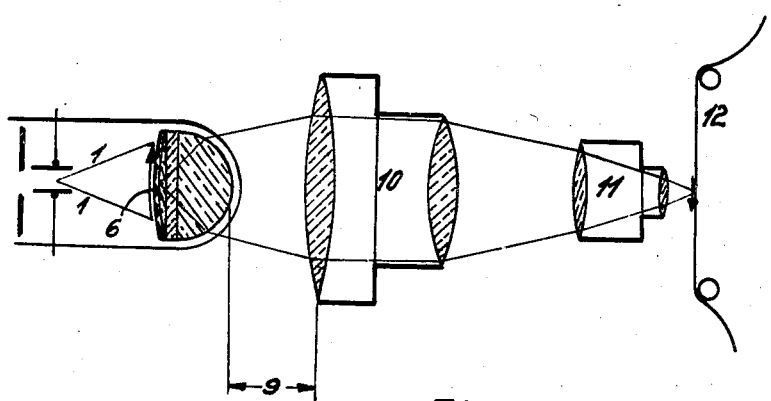

Of the drawing which illustrates the present invention by exemplary embodiments thereof, Fig. 1 shows in sectional elevation a part of a cathode ray tube, more particularly for television projection purposes, including the image screen, and the optical equipment associated therewith and designed according to the present invention, whereas Fig. 2 shows, likewise in sectional elevation and on a somewhat more reduced scale, a part of a cathode ray tube, more particularly for the purpose of scanning, at the transmitting end, objects to be televised, including the luminous screen, and the optical equipment associated therewith and designed according to the present invention.

Referring now to Fig. 1, the cathode ray 1, after leaving the anode 2 and being deflected by known means (plates or magnet coils 3), scans the inner wall 4 of the refractor objective 5 provided and arranged according to the invention. This objective consists in a preferred embodiment of the invention of a plano-convex lens 5a, a distance piece 5b and a plano-convex lens 5c. On the rear side, i. e., on the curved surface of the convex lens 5c, there is situated the luminous substance 6. The image point 7 is shown in central position 7a and in lateral position 7b. The wall 8 of the tube is made to be so thin and even that it does not affect the reproduction. By the way, the sensitivity of the reproduction against fogs in the glass wall is, when the refractor is situated within the bulb 8 so small that the problem of avoiding distortions can be solved in the technical production by giving the wall a thickness of approximately 1 mm.

The complete refractor 5a, 5b, 5c consists of one and the same glass sort. The part 5a and 5b corresponds to the magnifying lenses which have recently been placed on the market and illuminate their field of vision themselves, for example to the lens known as "Visolettglas", etc. These are lenses having a greatly curved surface and a large optical aperture angle. The spacing between object and lens is determined by the plano-parallel piece of glass 5b. The amplification of the surface light intensity corresponds to the extent to which the angle $\alpha$, at which the light leaves the refractor, is narrowed as compared to the angle $\beta$, at which the light leaves the image point on the luminous screen. It is possible in practice to maintain at a spacing of 5 cm. behind the refractor surface (9), a circle of light of approximately 80 mm. diameter, which can be fully embraced with good film objectives. In practice, for example, there was employed the objective designated 10 and having a graduated diameter, a so-called Neo-Kino of Busch, which possesses an inlet aperture 10a of 75 mm. diameter and an outlet aperture 10b of 55 mm. diameter.

A particular problem resides in obtaining a good marginal sharpness of a refractor arrangement of this nature. If the inner side of the refractor is flat, as is the case in magnifying glasses for reading purposes, the virtual image would be curved into the interior of the tube at the edges, as magnifying glasses of this character have an aplanatic effect. Actually it will be found that the edges can only be reproduced sharply by approaching the objective 10 towards the tube. According to the invention, this error may also be corrected by giving the inner side of the refractor a curved surface. In the case of the stated inwardly convex curvature 5c the object spacing is smaller in respect of marginal points than for central points, whereby it is possible to perform projection with marginal sharpness with constant position of the reproducing objective 10. The barrellike distortion of the scanning area then occurring simultaneously compensates the pin-cushion distortion of the reproducing optical system in respect of plane rectangles.

Tubes having built-in refractors according to the invention have resulted in a three-fold to four-fold increase in the light intensity per surface unit. With refractor diameters of 50 mm. and images of approximately 25–30 mm. diagonal, the sharpness of the edges is satisfactory. The optical system shown in Fig. 2 consists of the refractor 5, on the inner side of which there is provided the luminous substance 6, which is scanned by the bundle of cathode rays 1. On the refractor 5 follows an objective 10 of large optical aperture, adapted to project an actual image of 6 at a considerable distance, and on the objective 10 an objective 11 of greater refractive power, which produces a reduced actual image in the plane of 12 shortly behind itself. With focal distances of 10 and 7 mm. of the two objectives 10 and 11 respectively it is possible with a spacing 9 of about 8 cm. between the objectives and the tube to obtain a reduction to one-half, and naturally in the case of a greater spacing (9) a still further reduction. According to a further feature of the invention, the area of the refractor 5 is always selected to be about twice the size of the luminous image 6 projected thereonto. In the case of transmitters the lenses 10 and 11 are adjusted for reproduction on a reduced scale and in this manner the scanning image point is made, in purely optical fashion, to be smaller in the plane of the film 12 than it is within the tube 1. In this way the requisite high definition may be obtained with optical means, though the image points in the cathode ray tube be thick, and possess a correspondingly large amount of energy.

I claim:

1. In a cathode ray tube for the purpose of projection having a hemispheric end portion, a substantially flat luminous screen arranged about at the base of said hemisphere, and a nearly hemispheric lens practically filling out the space between said screen and the hemispheric wall of said tube, said lens being slightly convex on the side opposite to said end portion and being covered with said luminous screen, said lens being composed of a hemispheric part, a plano-parallel disc and a thin plano-convex lens, all of the same diameter, the convex side of the latter lens being covered by luminescent material so as to form said luminous screen.

2. In an arrangement for television projection, a cathode ray tube having a convex end portion and a biconvex lens arranged between a luminous screen and said tube end, said lens being strongly convex on the side near the wall of the tube and slightly convex on the opposite side, said luminous screen covering the slightly convex side of said lens, and, outside of said tube and in cooperation with said lens, two projection lenses in series, the first of said two lenses having a larger diameter than said biconvex lens.

3. A cathode ray tube for use in an optical projection system for television purposes comprising a luminescent screen, means for producing a cathode ray and for focusing same onto said screen, means for causing said cathode ray to scan said screen, and a light-optical lens mounted inside said cathode ray tube, the luminescent material forming said screen being disposed on the surface of said lens facing said means for producing a cathode ray, said surface of said lens being convex, and having such a curvature that the virtual image of said luminescent screen produced by said lens is disposed in a flat cross-sectional plane.

KURT SCHLESINGER.